United States Patent
Weeren et al.

(12)

(10) Patent No.: US 6,501,956 B1
(45) Date of Patent: Dec. 31, 2002

(54) PROVIDING BLENDED INTERFACE FOR WIRELESS INFORMATION SERVICES

(75) Inventors: Eric Weeren, Plano, TX (US); Mike Watson, Frisco, TX (US); Daren Wilson, McKinney, TX (US)

(73) Assignee: InterVoice Limited Partnership, Dallas, TX (US)

(*) Notice: Subject to any disclaimer, the term of this patent is extended or adjusted under 35 U.S.C. 154(b) by 0 days.

(21) Appl. No.: 09/690,775

(22) Filed: Oct. 17, 2000

(Under 37 CFR 1.47)

(51) Int. Cl.$^7$ ................................................ H04M 3/00
(52) U.S. Cl. ........................................ 455/463; 455/414
(58) Field of Search ................................ 455/414, 418, 455/466, 563, 566; 370/349, 389

(56) References Cited

U.S. PATENT DOCUMENTS

| | | | | |
|---|---|---|---|---|
| 5,732,216 A | * | 3/1998 | Logan et al. | 704/201 |
| 6,128,482 A | * | 10/2000 | Nixon et al. | 379/354 |
| 6,167,255 A | * | 12/2000 | Kennedy et al. | 455/404 |

* cited by examiner

Primary Examiner—Thanh Cong Le
Assistant Examiner—Nick Corsaro
(74) Attorney, Agent, or Firm—Fulbright & Jaworski L.L.P.

(57) ABSTRACT

The inventive system provides a user interface between a wireless communication device and an information service provider. The interface allows for a blended presentation of information and calling services for implementing an information service to a user of a wireless communication device. The user establishes an initial connection with a data network server to receive a particular service. The data network server sends a set of wireless protocol instructions to the user's mobile device. Based on these instructions, the mobile device will display information to the user which can be used to select a particular service. While preferably presenting a continuous display to the user, the wireless protocol instructions initiate a communication connection between the mobile device and a voice server with speech recognition capabilities. Depending on the service selected and identification of the user by whatever means, including call signals, the voice will run a particular voice application which interacts verbally with the user to perform the desired service allowing the user to control the service without the necessity of entering data or information using the keypad on the mobile device. After receiving the necessary input data from the user, the voice application will obtain the information responsive to the service request. The information is translated into a wireless application protocol and sent to the data network server where it is then available to be sent to the user's mobile device to complete the service. The communication connection is then terminated after which the data network connection will be reestablished to facilitate receiving the requested information. The user's mobile device can then display the resulting information to the user. As seen by the user, there is a continuous connection with the selected service from the initial receipt of the wireless protocol instructions to the final receipt of the requested information. Thus, the user is presented a blended data and voice interface for access to the information service.

41 Claims, 7 Drawing Sheets

SERVICE CENTER VRU 22

VOICE MESSAGE STORAGE UNIT 40

| MESSSAGE # | MESSSAGE |
|---|---|
| 1 | - THANK YOU FOR CALLING THE IVB LOCATOR SYSTEM |
| 2 | - PLEASE SPEAK YOUR USER ID |
| 3 | - YOUR USER ID HAS BEEN DISPLAYED ON YOUR PHONE. IF THIS NUMBER IS CORRECT, SAY "YES" NOW. |
| 4 | - WHAT TYPE OF SERVICE DO YOU NEED? <WAIT 1 SECOND> ..... OR SAY "HELP" TO HEAR A LIST OF SERVICES OFFERED. |
| 5 | - DO YOU HAVE ANY FAVORITES? |
| 5a | - McDONALDS IS CURRENTLY OFFERING A FREE DRINK TO ALL OUR CUSTOMERS. |
| 6 | - YOU MAY SAY "INDEX" FOR A LIST OF FAST FOOD RESTAURANTS IN YOUR AREA. |
| 7 | - THANK YOU. I AM LOADING THE RESULTS TO YOUR WAP SITE. GOOD BYE. |

SERVICE CENTER VRU 22

VOICE MESSAGE STORAGE UNIT 40

| MESSSAGE # | MESSSAGE |
|---|---|
| 1 | - THANK YOU FOR CALLING THE IVB LOCATOR SYSTEM |
| 2 | - PLEASE SPEAK YOUR USER ID |
| 3 | - YOUR USER ID HAS BEEN DISPLAYED ON YOUR PHONE. IF THIS NUMBER IS CORRECT, SAY "YES" NOW. |
| 4 | - WHAT TYPE OF SERVICE DO YOU NEED? <WAIT 1 SECOND> ..... OR SAY "HELP" TO HEAR A LIST OF SERVICES OFFERED. |
| 5 | - DO YOU HAVE ANY FAVORITES? |
| 5a | - McDONALDS IS CURRENTLY OFFERING A FREE DRINK TO ALL OUR CUSTOMERS. |
| 6 | - YOU MAY SAY "INDEX" FOR A LIST OF FAST FOOD RESTAURANTS IN YOUR AREA. |
| 7 | - THANK YOU. I AM LOADING THE RESULTS TO YOUR WAP SITE. GOOD BYE. |

FIG. 4B

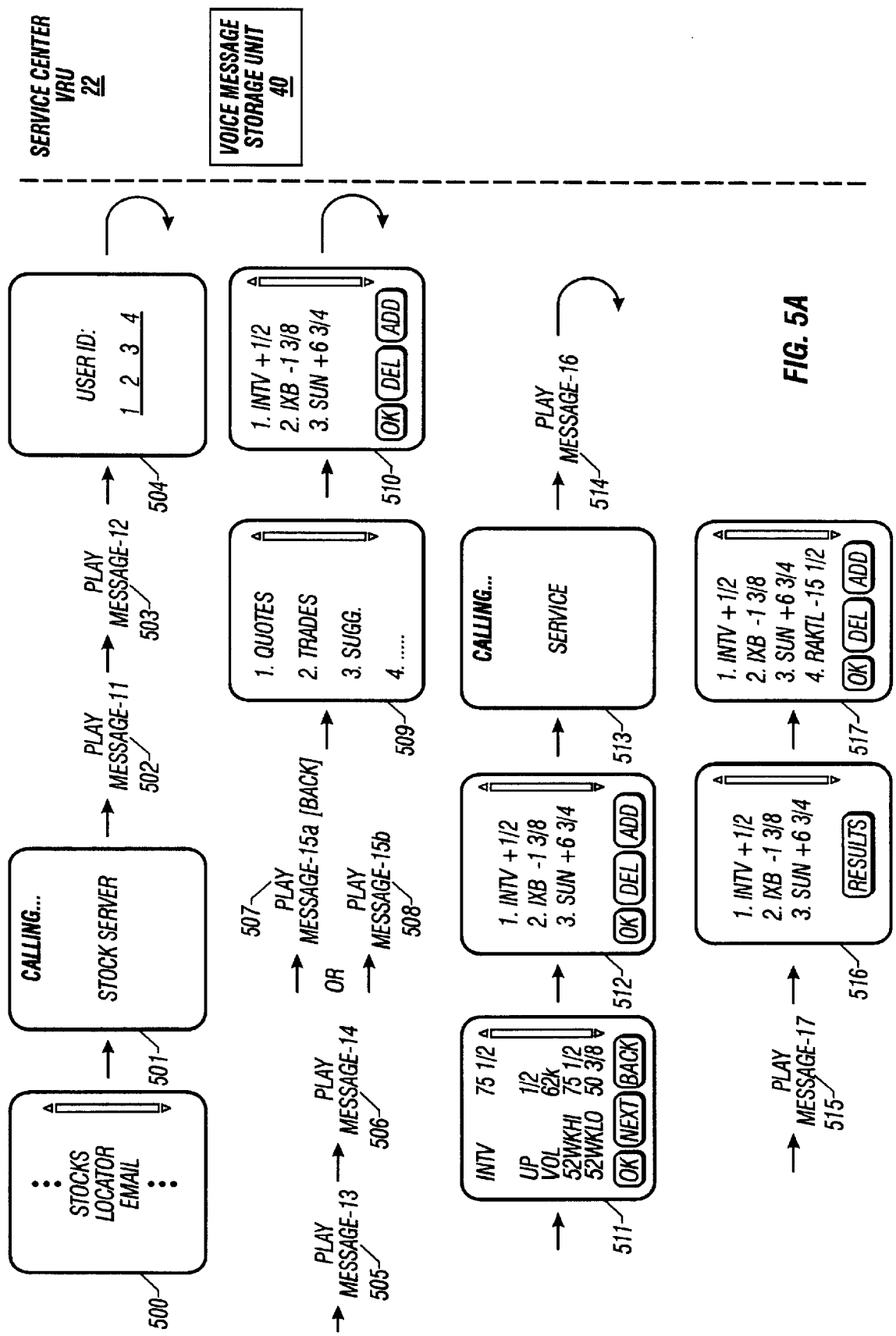

FIG. 5B

SERVICE CENTER VRU 22

VOICE MESSAGE STORAGE UNIT 40

| MESSAGE # | MESSAGE |
|---|---|
| 11. | - THANK YOU FOR4 CALLING THE IVB STOCK SERVICE |
| 12. | - PLEASE SPEAK YOUR USER ID. |
| 13. | - YOUR USER ID IS DISPLAYED ON YOUR PHONE. IF THIS NUMBER IS CORRECT, SAY YES.. |
| 14. | - PLEASE SPEAK YOUR PASSWORD. |
| 15a. | - I'M SORRY THAT IS NOT THE CORRECT PASSWORD |
| 15b. | - THANK YOU. YOU MAY NOW MAKE YOUR SELECTION |
| 16. | - WHAT STOCK WOULD YOU LIKE TO ADD TO YOUR WATCH LIST? SPEAK THE NAME OF SYMBOL |
| 17. | - THANK YOU, RAKTL HAS BEEN ADDED TO YOUR WATCH LIST |

PROVIDING BLENDED INTERFACE FOR WIRELESS INFORMATION SERVICES

BACKGROUND

The integration of computers and telephony services has grown tremendously over the last decade. Rapidly advancing technology in combination with decreasing equipment costs have spurred the computer-telephony integration (CTI) industry to new heights. Because of these advancements, telephone service providers are now generally able to offer more complex calling services to a wider population and at a lower cost than previously available.

In the evolution of the modem communication network, all telephone services, including so-called "enhanced" services, were previously provided by telephone switches. Every time a new calling service was developed, the switch had to be re-programmed by the switch vendor to implement that calling service. Because of the enormous complexity and expense of telephone switches, new calling services were generally delayed until the new switches were implemented. This process and the enormous costs of switches typically prohibited smaller telephone service providers from introducing and implementing their own calling services.

In response to this slow progression, the industry developed a design architecture called Advanced Intelligent Network (AIN). AIN architecture allowed much of the call processing and calling services to be removed from the switches and placed in peripheral computing systems. The AIN architecture uses peripheral computing systems as service control points (SCPs), service nodes (SNs), and intelligent peripherals (IPs) to provide call processing and calling services. Telephone service providers could now invest in relatively inexpensive computers with enough processing power to provide the enhanced calling services and call processing. This opened the market for calling services to the smaller telephone service providers.

The Internet has also experienced unmatched growth over the last decade. A vast array of information and services is now accessible to anyone with an Internet connection.

Most companies have web sites or web-enabled databases. Services which were previously limited to interactive calling implementation, such as information services, home banking, stock trading, and retail sales, have now become a mainstay of Internet commerce. Within the last five years, advancing technology has allowed Internet service providers (ISPs) to enter the long distance telephony market in competition with traditional telephone service providers. This evolutionary step established the potential for integration of the Internet with traditional CTI.

Recently, in the wireless phone industry, Internet content has become accessible, in a limited format, over a new design of wireless phone and wireless data terminals, and the development of wireless information formats. In addition to all of the communication services available to wireless phone users, they now enjoy limited access to the Internet content over an expanded visual display on their wireless phones. While this limited integration has increased the services and information resources available to the public, the amount and character of the information and services available is limited by the current technology.

The availability of Internet-based information and services based upon standard digital data networking and Internet standards such as hypertext transfer protocol (HTTP), transfer control protocol (TCP), Internet protocol (IP), extensible markup language (XML), hypertext markup language (HTML), scripting formats and others, which allow access to the Internet information relatively independent from a particular platform, creates a problem for mobile communication device users. With the memory, power, and input/output limitations inherent in the small mobile communication devices, it becomes increasingly difficult to take advantage of the current digital networking and Internet standards.

In response to this limitation, the industry has developed resource conservative alternatives to the current Internet and information protocols. Wireless Application Protocol (WAP) has risen to the top of these conservative alternatives as the defacto standard transport protocol for delivery of wireless information and telephony services to wireless devices.

Using WAP, information and resources are generally transported in a format which is more appropriate for wireless handheld device users. A WAP Gateway typically converts web protocols, such as HTTP and TCP/IP, into WAP transfer protocol and vice versa. To a limited extent, the WAP Gateway may also translate web content into the proper, reduced-sized format for display on a smaller handheld device, if it includes the appropriate logic and processing capabilities. Through appropriate use of proxy technology, much of the computational functionality is accomplished via the WAP Gateway, thus, further eliminating the need for excessive on-device memory and power.

The emerging wireless application protocols and formats (e.g. WML, HDML, see below) generally allow the use of soft keys (keys which have multiple functions dependent on the mode or function the handheld devices is operating in) for enabling users to make menu selections, scroll through multiple screens or "cards," as they are referred to in WML. The availability of an alphanumeric keypad on most hand held devices allows for entry of standard text or numeric information either with dual tone multifrequency (DTMF) or other data signal criteria. Therefore, the presentation of the information is tailored to fit within the space confines and interactivity limits of a handheld device interface.

In addition to the WAP-styled technology, small-scaled web browsers are normally used to navigate through the information while presenting a familiar interface to the user. These small-scaled browsers, called mini-browsers, are typically designed to render mark-up languages designed specifically for the memory, input/output and bandwidth limitations of mobile handheld devices communicating over a wireless network. Two of the more prevalent languages, Handheld Device Markup Language (HDML) and Wireless Markup Language (WML) allow navigation similar to the standard HTML and use a tag-based language set defined as an XML document type. These wireless mark-up languages typically conserve memory resources by converting much of the overhead necessary for navigation into smaller machine-code or binary representations. WML or HDML applications can be written using existing HTML and XML development environments.

Although WAP and languages such as, HDML and WML, succeed in presenting a familiar interface compatible with a mobile handheld device, the inherent limitations of this interface complicates the user's interaction. Entering even a small amount of textual information using a 12-key alphanumeric keypad requires a great deal of concentration and detailed manipulation for the user. Furthermore, soft key functions must be arranged in standard locations in order for a user to navigate intuitively through "glance and touch" activation. In most instances, a user is engaged in multiple tasks when using a wireless device. Such a user will be less inclined to access a wireless information service if it requires too much special, physical attention.

SUMMARY OF THE INVENTION

It would, therefore, be advantageous to have a fully-integrated communication system which may access and supply information services from the Internet, corporate databases, and other electronic information media and also provides enhanced interface between the user and the information service. It would also be advantageous to provide a simpler user interface which allows a user to control access to information and application functionality using basic inherent skills and minimized device manipulation. These and other features and technical advantages are achieved by a system that allows a blended communication and information system which can supply electronically accessed information to mobile devices and also provides a simple, intuitive interface between a user and an information service provider. Such mobile devices may include items like wireless telephones, handheld computing devices, pagers, and other electronic equipment which include a display, memory, processing capability, and some form of user interface for receiving user input.

The system provides a wireless information service interface for use between a communication device and an information service provider comprising a first server and a second server. In the preferred embodiment of the present invention described in this application, the first server would be a communication server with a data network connection wherein the server enables communication with the wireless data networking features of the communication device. The second server would preferably include a voice response unit (VRU) with a telecommunication connection and one or more voice applications, wherein the VRU provides voice prompts and/or audio information to the communication device over its telephony interface (via the PSTN). The VRU preferably has speech recognition capabilities allowing users to respond verbally to voice prompts created by any one or more of the voice applications.

According to a preferred embodiment of the present invention, the interface may include a data network server capable of providing information compatible with the communication device. The data network server preferably includes one or more data applications accessible by the communication device, wherein the data applications may provide visual information to the communication device, and are capable of automatically initiating a telecommunication connection between the communication device and the VRU. Once such a telecommunication connection is established, the VRU may selectively run one or more of the voice applications based on information provided to the VRU by the data application, the user, or a remote host application server in communication with the VRU or data network server.

In operation according to a preferred embodiment, a user will access one or more of the data applications via the data network server. The data application will then generally send a set of compatible instructions for controlling the application which are stored in a memory on the communication device. The application then preferably initiates a telecommunication link with the VRU sending data which allows the VRU to selectively activate one or more of the voice applications. It should be noted that the data application's initiation of the telecommunication link may preferably be prompted by the user responding to an action that the data application presents or may preferably be automatically initiated by the data application either if the information that the data application is attempting to present is too complex for the communication device display, or the data application itself incorporates the simultaneous use of the voice application to accept and present input or output. Once the telecommunication link is established, the data application may then be suspended until the telephony session terminates, or allowed to process as a background task, depending on the capabilities of the wireless data network and handsets as well as the details of the application.

The VRU can preferably obtain information either from the data application, directly from the user using speech recognition technology, through data signals generated by the communication device, or from a remote host application server. Using selected voice prompts, text-to-speech capabilities, and/or pre-recorded messages, the voice application processes and obtains the information desired by the user. When the voice application has obtained the requisite data, it preferably places the information into memory storage, informs the caller that the information can be retrieved from the data network server, and suspends or terminates the telecommunication link. Alternatively, the voice application may present some of the retrieved information verbally to the user, if it is not too complex or long. Alternatively, the voice application may interact with the user to gather input needed to retrieve the information for the user and pass this input back to the data application server for actual information retrieval and presentation. As the telecommunication link is suspended or terminated, the data application is brought back to the foreground, such as by reactivation or redesignation as the active task, to operate with the user. Thus a preferred embodiment of the system allows for either the data application server or VRU server or both to have the ability to access the host application server.

A wireless data application generator, which can be a WML page generator, an HDML page generator, or some other wireless data application language, builds the data application information in a format compatible with the mobile communication device and wireless data network. The wireless data application generator then forwards the information to the data network server for final transmission via the wireless data network to the communication device. The application information thus sent to the communication device for rendering and user interaction may include both application navigation structures and data retrieval and presentation structures. For typical situations, there will preferably be a single button or command presented to the user on the communication device so the user can retrieve the information or initiate actions with single button actuation. Other situations may result in an automatic push of the data to the communication device when the data application is operating in the foreground.

After the wireless data application generator has forwarded the application information, some or all of the information may remain in the memory storage indefinitely. An alternative embodiment of the present invention would preferably provide the user addressable access to the memory storage for retrieving the information more than the one, initial time. Preferably, the user would be able to repeatedly access the user-specific memory location to review any or all of the currently stored information-retrieval results. The memory could be configured to retain all of the retrieved information until either the user deletes it, or the service provider deletes it according to terms negotiated in a service contract. Alternatively, the information may be deleted when subsequent activity by the user stores new information.

It should be noted that the preferred embodiment of the present invention is not limited solely to wireless communication devices. A conventional wireline telephone could also benefit from the services and interface disclosed by the preferred embodiment. In order to implement the preferred embodiment of the present invention, a wireline phone would typically have a visual display either built directly into the unit or as a supplemental display unit and some degree of memory capability. Such a telephone would generally also have processing capabilities to operate functions, programs, and instructions written in a wireless application protocol. In the use of this alternative embodiment, a desk phone could be connected to the Internet or other data network which could provide access to phone directories, locator services, retail services, or other information services available to the wireless communication device user. Alternatively, a standard data network access terminal such as a PC with internet access connectivity and browser software further enhanced with a voice telephony capability could also be used for the same purpose.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which:

FIG. 4B is a diagram showing the sequence of voice messages played which correspond to the preferred embodiment of FIG. 4A;

FIG. 5A is another flow diagram showing the steps executed by a preferred embodiment of the present invention executing another typical application which includes typical corresponding user interface displays; and FIG. 5B is a diagram showing the sequence of voice messages played which correspond to the preferred embodiment of FIG. 5A.

DETAILED DESCRIPTION OF THE PRESENT INVENTION

A preferred embodiment of the inventive system allows a blended communication and information system which can supply electronically-accessed information to mobile devices and also provides a simple, intuitive interface between a user and an information service provider. In order to appreciate the novelty of this preferred embodiment of the present invention, it is helpful to review the current state of the art with regard to providing information and telecommunication services.

Figure 1A:
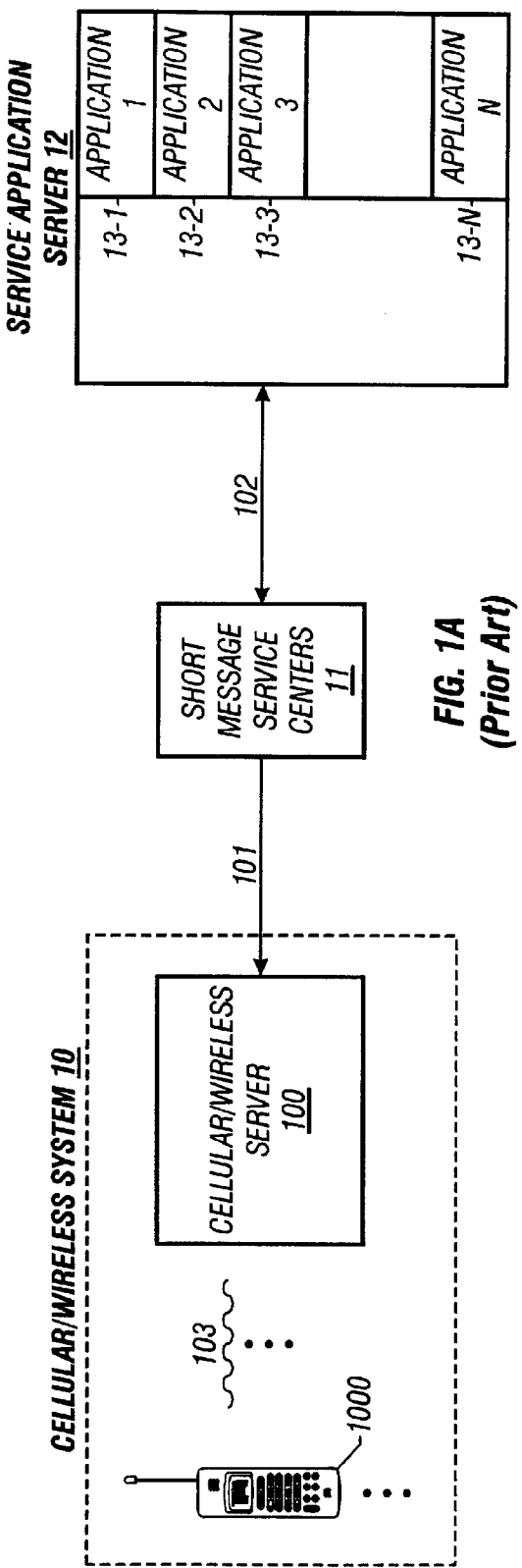
FIG. 1A is a block diagram representing the prior art interface and information services provided to mobile communication terminals using short messaging service.

In its earliest forms, provision of information to mobile devices generally comprised use of the short messaging service (SMS) which transports messages of up to 160 characters in length over the paging services of the Global System for Mobile Communications (GSM) or other current wireless system technology. FIG. 1A shows the basic operation of such information services provided over an SMS system. In one embodiment, the user typically signs up in advance for a messaging service to receive some kind of information at regular or deterministic intervals, such as a news headline service. Service Application Server 12 may execute any one or a number of applications 13-1 through 13-N to retrieve the news headlines. Service Application Server 12 then would normally forward the news headlines through connection 102 to SMS Center 11. SMS Center 11 usually converts the news headlines into a message less than 160 characters in length and then sends the message at a predetermined time to mobile device 1000 in Cellular/Wireless System 10 through connection 101 with Cellular/Wireless Server 100 and connection 103 between Cellular/Wireless Server 100 and mobile device 1000. The SMS system typically provides a one-way information route. The user must typically sign up in advance for the particular desired service and cannot interact with SMS Center 11 through mobile device 1000. Such SMS systems are currently in use by wireless communication providers.

In a separate embodiment of the SMS system, a user may typically call a specific number designated for the information service and then hang up. Service Application Server 12, takes either the user's ANI or DNIS signal and determines which service the user is calling for. In this embodiment, even though the user can trigger the delivery of the information, the level of interaction is negligible.

Figure 1B:
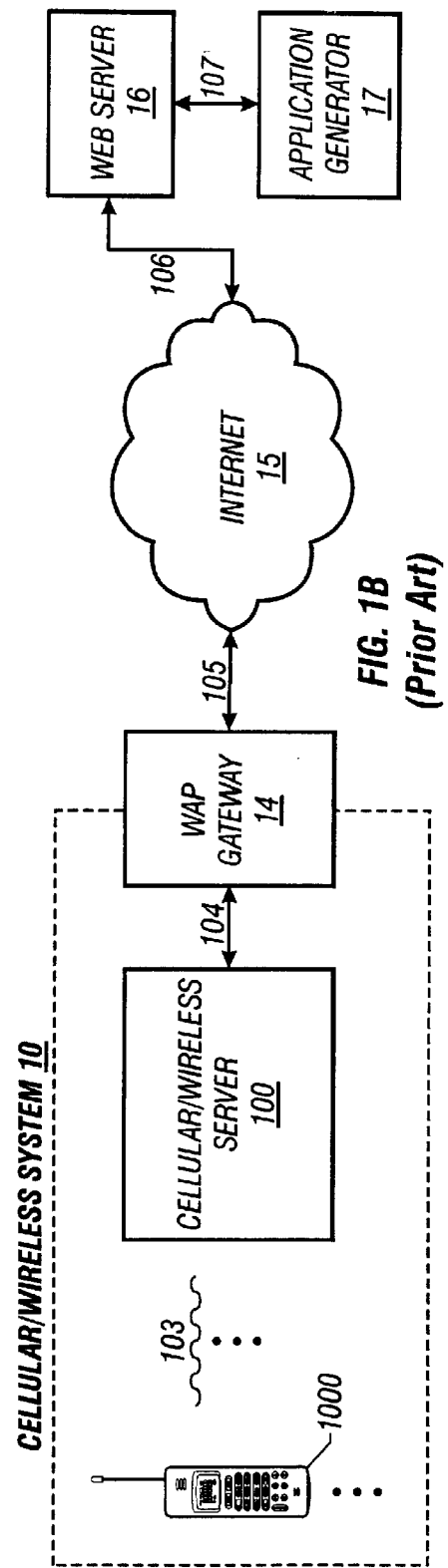
FIG. 1B is a block diagram representing the prior art interface and information services provided to mobile communication terminals using wireless compatible formats.

In the more recent embodiment of mobile information services, WAP-based systems have increased the amount of information transmittable and the interactivity between the user and the information service. FIG. 1B shows the basic functionality of the prior art WAPbased systems. In one embodiment, a user typically subscribes to an information service offered over the public Internet 15 through Cellular/Wireless System 10. The user's mobile device 1000 would generally contain a mini-browser that interprets a wireless device compatible language, such as WML or HDML. At anytime, the user may access the subscribed information service through mobile device 1000. Mobile device 1000 establishes a connection with Cellular/Wireless Server 100 through link 103. The signal from mobile device 1000 usually indicates the user's request to access a WAP-based service. Cellular/Wireless Server 100 may initialize a connection with WAP Gateway 14 over link 104. Based upon the address entered by the user on the mobile device 1000 of the desired information service, typically specified as a uniform resource locator (URL), WAP Gateway 14 would forward the user request via link 105 to Internet 15, after converting the request from the wireless data protocol (such as WAP) to HTTP over TCP/IP. Internet 15 would route the request to the HTTP Server 16 over link 106 based upon the URL. HTTP Server 16 would then interact over link 107 with Wireless Data Application Generator 17 to retrieve the response to the specified user request. This response then would be sent over the reverse path ultimately arriving at mobile device 1000 and being rendered by the mini-browser contained therein. The response from the modified web site (HTTP Server 16 and Wireless Data Application Generator 17), may have been specifically written for WAP-enabled devices. If necessary, WAP Gateway 14 may include functionality to translate more prevalent Internet formats such as HTML into wireless application compatible formats such as HDML or WML and transmit the informational contents to mobile device 1000's visual display using WAP.

The user may then view or interact with the wireless-formatted information on his/her visual display screen using available function keys.

The user generally may navigate through several "cards," which are display-sized screens of information corresponding to pages in HTML, using the keys or buttons on mobile device 1000. The user may also jump to other wireless-enabled web sites through displayed WML or HDML hyperlinks using the mobile device keys or buttons. At the actuation of a hyperlink, WAP Gateway 14 typically translates the corresponding Uniform Resource Locator (URL) and accesses the associated web site over the Internet. The keys or buttons on mobile device 1000 generally offer the only interface between the user and the information desired. Keys must be actuated to scroll through menus or WML cards. Keys must also be actuated to enter textual or numeric information. A mobile device user will typically be engaged in other activities (i.e., driving, walking, or talking) in addition to operating the device, therefore, the attention necessary to accurately obtain the desired information can be dangerously excessive.

Because the WML protocol defines telephony functionality such as in the WTA, currently accessible WML cards may allow for users to initiate telephone calls from a selection on the WML card display. In a typical example of such an implementation, a vendor's WAP-accessible website may have a menu option which dials the vendor's store. Therefore, by making a choice to call the vendor, the WML card accesses the telephony functionality of the wireless network to establish a call between the user's telephone and the vendor's store. However, once the call is initiated, the telephone typically loses access to the WAP/data network.

Figure 2:
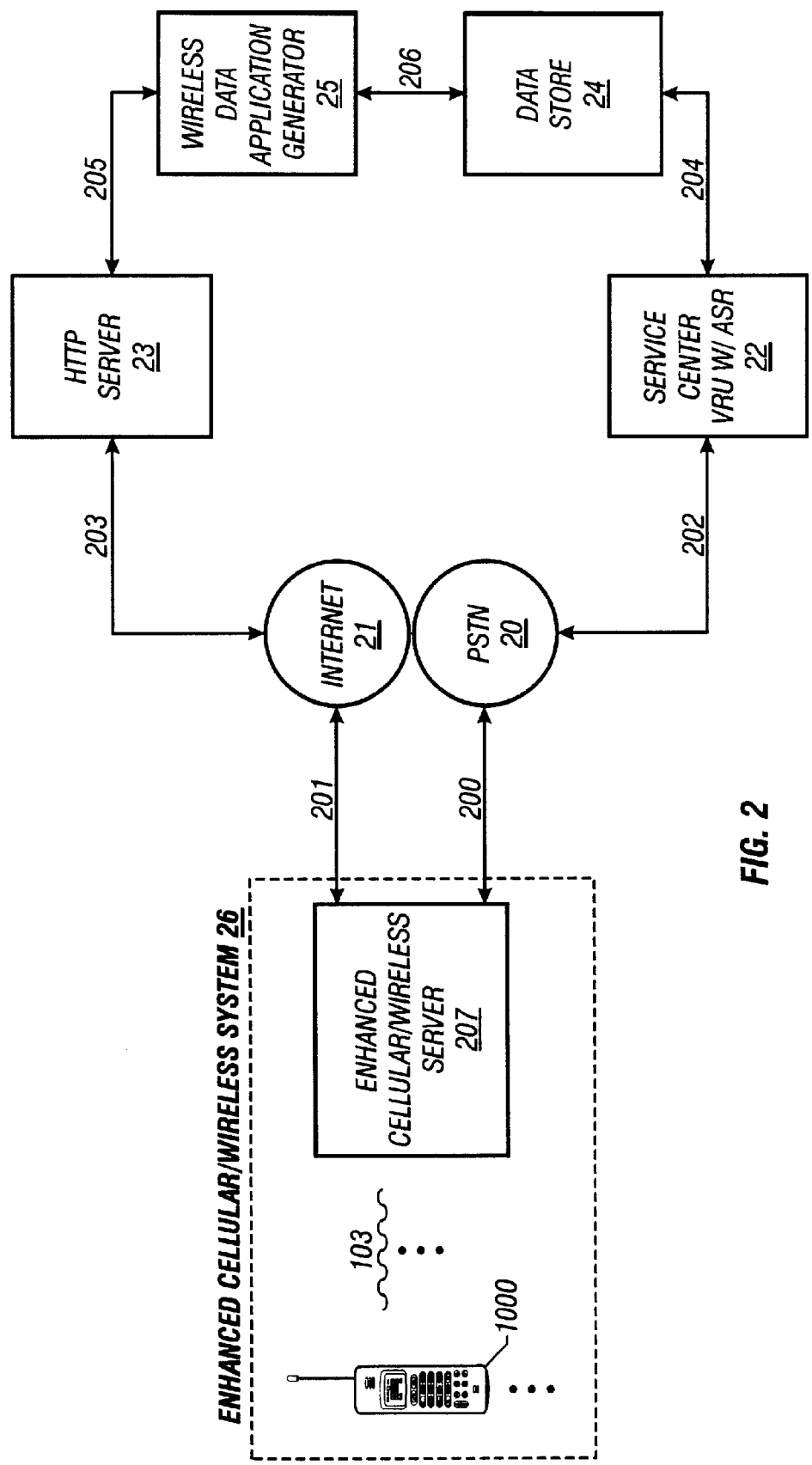
FIG. 2 is a block diagram representing the service and interface configuration of a preferred embodiment of the inventive system.

FIG. 2 illustrates a preferred embodiment of the present invention which allows for a blended, simple interface between the user and the information or services desired. In this embodiment, a user typically subscribes to an enhanced information service over the public Internet 21 through Enhanced Cellular/Wireless System 26. At any time, the user may access his/her subscribed service through mobile device 1000. Mobile device 1000 establishes a connection with Enhanced Cellular/Wireless Server 207. Enhanced Cellular/Wireless Server 207 preferably includes functionality to convert non-wireless compatible protocols into wireless-compatible protocols. In operation, Enhanced Cellular/Wireless Server 207 preferably recognizes the signal from mobile device 1000 to access a data network server such as HTTP Server 23 through Internet 21 and links 201 and 203. HTTP Server 23 sends a WML card, other wireless application, information, or an Internet application, which will preferably be converted to the appropriate wireless format and protocol by Enhanced Cellular/Wireless Server 207, to mobile device 1000 through Internet 21 and Enhanced Cellular/Wireless Server 207 over links 203, 201, and 103. Mobile device 1000 typically displays one of the wireless data application screens that lists a menu of services available to the user. The user would then generally select the desired service by scrolling and actuating the keys or buttons corresponding to the service selection. In an alternative embodiment, HTTP Server 23 may maintain a relational database which associates a particular service or group of services with a particular caller or mobile device; Data Store 24 may be used for this purpose. In such an alternative embodiment, HTTP Server 23 sends the particular WML card or wireless application display information associated with the activated service to mobile device 1000.

When the user makes particular service choices, the wireless application may initiate a telephone call from mobile device 1000 to Service Center VRU 22 through Enhanced Cellular/Wireless Server 207 and PSTN 20, the public switched telephone network, over links 103, 200, and 202. It should be noted that the decision to make or not make a telephone call will preferably depend on the type of application being executed as well as the type of input and output required. If long and/or complex input is required by the application, the preferred embodiment of the present invention provides for the application to initiate a telephone call so the user may provide such long or complex input verbally using advanced speech recognition features (ASR) available on the VRU. This feature preferably simplifies the input process and implements the most novel aspect of the present invention. Instead of inputting a paragraph or more of complex information using the typical twelve keys of a mobile phone or limited manual input, the user is allowed to speak the information to Service Center VRU 22. The same logic will provide for manual input using the mobile device keys where the input is relatively simple or limited to a "yes or no"-type entry, or simple menu selection. Similarly, the choice of output modes will also be determined by the logic internal to the system and the wireless application. Where a single word or a few words of data is retrieved, the application may preferably speak the answer using Service Center VRU 22. However, if the retrieved information is longer than may typically be remembered by a user, the system will choose to display the retrieval results on the users mobile device display. Thus by using the ASR capabilities of Service Center VRU 22 to collect complex input from the user and the display capabilities of the user's wireless handset 1000 operating in data mode to present lengthy or complex output, the principle and novel goals of an enhanced user interface to an information service of the presently disclosed invention are achieved.

If the input or application being run requires the user's verbal interaction, the telephone call is initiated. When Service Center VRU 22 answers the phone call, it preferably reads call data sent with the telephone call and uses this information to determine the particular service to be offered to the current user. The call data may include mobile device 1000's mobile identification number (MIN), an automatic number identification (ANI) signal, the dialed number identification signal (DNIS), data signals sent by the actuated wireless application function, and/or any other useful information, or combination thereof. The call data may also comprise data or information provided by a host application server either local to or remote to Service Center VRU 22, such as HTTP Server 23, or an external host application server not shown in FIG. 2 but accessible from either Service Center VRU 22 or HTTP server 23. If the call data used is a MIN or ANI signal, Service Center VRU 22 may access a relational database which relates the particular MIN or ANI signal to a particular service or group of services. DNIS may also be used to specify a particular service or group of services, which may preferably be implemented by the Data Store 24. In the case where the service is selected based on data signals sent by the wireless application, this data could be generated by the wireless application itself, or may comprise information entered by the user while accessing the data network.

Service Center VRU 22 may also elicit information directly from the user to determine the user's service choice. Upon determination of the particular service to be offered, Service Center VRU 22 preferably plays pre-recorded messages and prompts to the user over mobile device 1000. These pre-recorded messages may ask for user identification data, can instruct the user how to operate the service, may ask for information necessary to complete the service, and can also instruct the user how to retrieve the requested information. In a preferred embodiment, Service Center VRU 22 may be equipped with speech recognition technology so the user can speak the necessary responses and service choices thereby minimizing the number of times required to actuate the keys or buttons on mobile device 1000. When Service Center VRU 22 has obtained requested information for user, either from a local database or from a remote application server, and the information is determined to be best presented in another media, such as by displaying it on mobile device 1000's display screen, Service Center VRU 22 preferably informs the user that he/she may retrieve the information in this other media, such as by instructing the user to actuate a "RESULTS" button on mobile device 1000 after the termination of the telephony call, when the handset preferably returns automatically to data mode. Additionally or alternatively, operating in cooperation with Service Center VRU 22, HTTP Server 23 and/or Enhanced Cellular/Wireless Server 207 may automatically push the information to the other media, with or without audible notification to the user by Service Center VRU 22.

Behind the call layer, Service Center VRU 22 generally obtains the information responsive to the service request and may store it into Data Store 24 through link 204. Because the data obtained may not be in a wireless-compatible format, Wireless Data Application Generator 25 could access the data in Data Store 24 through link 206 and convert the data into the appropriate wireless format. Wireless Data Application Generator 25 may then forward the translated information to HTTP Server 23 through link 205. Of course, HTTP Server 23 may obtain the information directly, such as when Enhanced Cellular/Wireless Server 207 includes the aforementioned conversion functionality. HTTP Server 23 may then hold the information until it receives a retrieval request from mobile device 1000 or may proceed to automatically push the information to mobile device 1000 using available wireless data push technology such as external SMS service (not shown in FIG. 2).

It should be noted that in an alternative preferred embodiment, Data Store 24 will preferably store the retrieval results indefinitely. This embodiment would preferably allow a user to access a user-specific memory location which contains some portion, and possibly all, of the user's previous retrieval results. The indefinitely permanent memory location preferably allows the user to repeatedly access the retrieved information for use or consideration, without requiring the user to repeatedly enter the information required to retrieve the data initially. For example, if a user accesses a travel service and receives a list of several potential flight times, these times could be saved and accessed by the user if he/she later decides to change flights. Furthermore, some applications could be equipped with an update feature that automatically updates all of the flight information, such as gate or availability, directly in the list of flights stored in the user's memory location, without requiring intermediate user interaction. A user could preferably access the memory based on the MIN or ANI of mobile device 1000, or by some combination thereof, with a password, account number, or by any other method determined to provide an appropriate balance of security and accessibility. The stored information will preferably remain in Data Store 24 until deleted by the user or by the network provider, in accordance with any service contract provisions.

When Service Center VRU 22 informs the user that the information has been obtained, or at any other time that the blended operation results in at least a temporary completion of audible user interaction, the call can either be terminated or suspended depending on the particular service being performed. If the service requires several interactive layers of data acquisition and user decision-making, Service Center VRU 22 may signal to suspend the communication connection until the user has retrieved the previous information. Otherwise, Service Center VRU 22 may terminate the call. Some wireless network carrier infrastructure implementations may in fact require multiple independent telephony call interactions to complete the desired service. When the call has been suspended or terminated, the calling wireless application on mobile device 1000 preferably reestablishes the data connection between mobile device 1000 and HTTP Server 23 or otherwise reestablishes the wireless application's foreground presence in mobile device 1000. The wireless application also would preferably display a "RESULTS" button (or soft key) on mobile device 1000's visual display. If the user desires to retrieve the information, he/she may actuate the "RESULTS" button. The wireless application sends the "results" command to HTTP Server 23 which preferably responds by sending the new wireless application data or information containing the results to mobile device 1000's visual display. The user may then view the information by scrolling through the displayed information. If the service activated requires additional processing, the calling wireless application may signal to reestablish the call with Service Center VRU 22. Once the communication connection has been reestablished, Service Center VRU 22 may continue prompting for further information appropriate to completing the service. The data and call connections may continue to alternate until the service has been completed. It should be noted that even though the connections are suspended and reestablished, the preferred embodiment of the present inventions appears to the user as a continuous blended service of data and voice information from initiation to completion.

It should also be noted that in an alternative embodiment, HTTP Server 23 may automatically send the retrieved information to mobile device 1000. In this embodiment, Service Center VRU 22 forwards the retrieved information to HTTP Server 23 either directly or through Data Store 24 and Wireless Data Application Generator 25. HTTP Server 23 may then automatically send the new wireless application data or information to mobile device 1000 when the data connection has been reestablished. This alternative embodiment further minimizes the number of times the user must actuate buttons or keys on mobile device 1000. The suitability of this alternative embodiment for use will depend on the specific nature of the information service being implemented using the presently disclosed invention.

The preferred embodiment of the present invention has been described to this point as including a VRU to implement voice applications. It should be noted that the present invention is not limited to implementation with only VRUs. Any media or multimedia server may be used in a preferred embodiment of the present invention. Voice, as well as video, information may be exchanged with mobile device 1000 in executing applications and operations of the present invention. In addition, it should be noted that when the state of the art of mobile device implementation proceeds to the point where advanced speech recognition features can be implemented by an application executing exclusively in the handset or Enhanced Cellular/Wireless Server 207 and the handset, the present invention may be implemented using such technology without the need for an external VRU.

Figure 3:
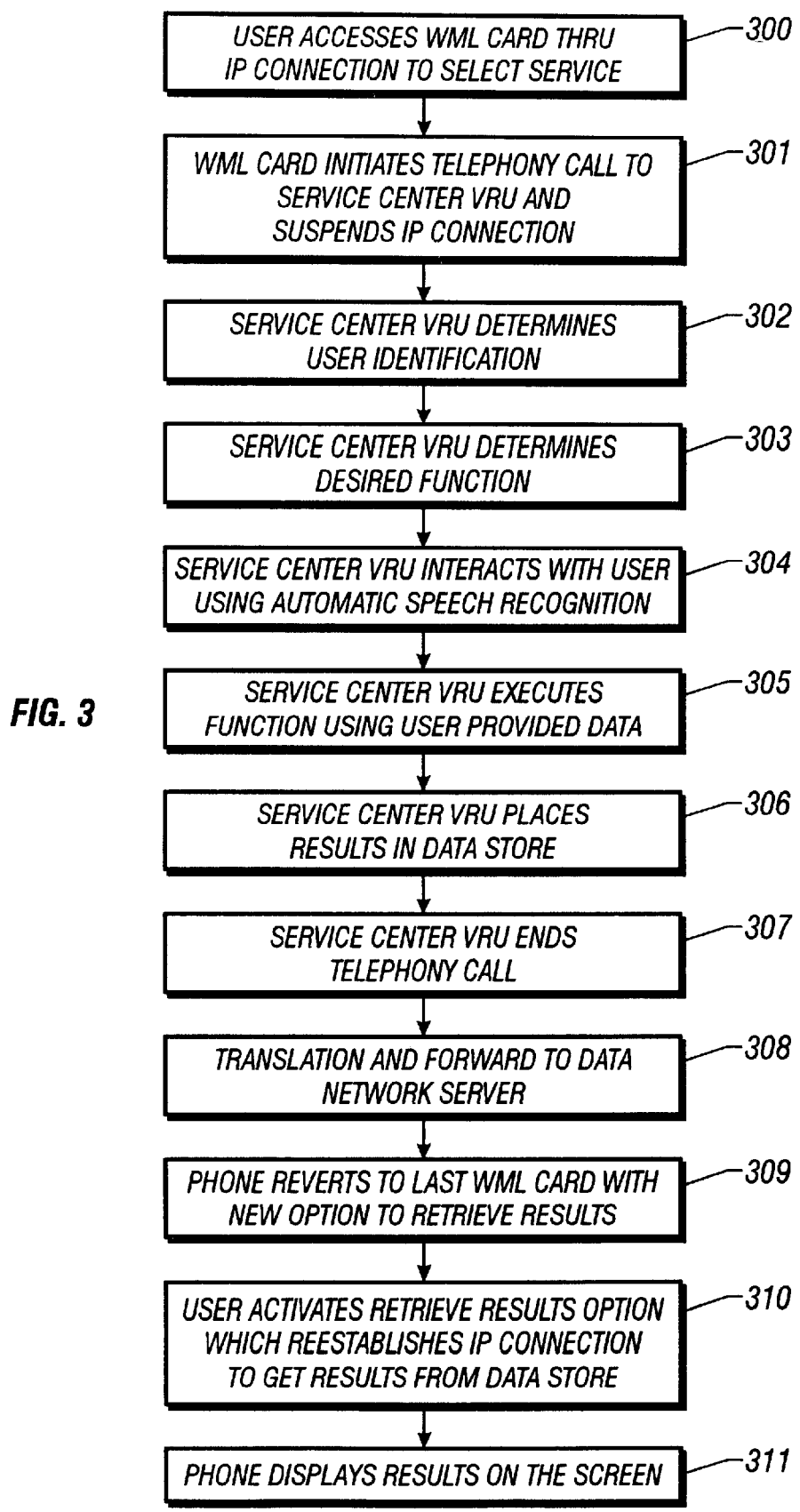
FIG. 3 is a flowchart showing the steps executed by a preferred embodiment of the present invention.

FIG. 3 is a flow diagram which describes the call and data flow of the preferred embodiment of the present invention. In step 300, the user accesses wireless application data or information through a data connection in order to select a particular service. The wireless application then automatically initializes a telephone call to the service center VRU, in step 301, in addition to preferably suspending the data connection. During the suspension of the data connection, the wireless application may continue to be operational. For example, where additional data processing may be usefully conducted while information is being audibly elicited from the user, the wireless application may continue to process this data for use when the data link is reestablished. Of course, there is no limitation that the data link be suspended according to the present invention. For example, where mobile device 1000 provides a suitable digital platform, the data link and voice link may be multiplexed, such as through time or code division multiple access (TDMA or CDMA) techniques, or may be simultaneously and independently active, as proposed Third Generation (3G) wireless infrastructure specifications provide.

In steps 302 and 303, the service center VRU preferably determines both the identity of the user and the desired function to perform. However, in an alternative embodiment, the Service Center VRU 22 may make other determinations, such as only obtaining the user identity, or only the desired function to perform or other useful information, whether alone or in combination with additional information. In step 304, the service center VRU preferably interacts with the user using speech recognition technology to play pre-recorded or text-to-speech messages or prompts to the user and also obtain information from the user's spoken responses to the VRU's prompts. It should be noted that a user may enter information in response to the VRU prompt's through DTMF key actuation as well. In a system with this capability, the user may, as desired, enter information through key actuation in combination with or alternatively to voice recognition. When the appropriate information is obtained from the user, the service center VRU will preferably execute the function to obtain the requested information or service in step 305. In step 306, the service center VRU preferably places the results into data store 24 for subsequent use by the wireless data segments of the application executing on Wireless Data Application Generator 25. In step 307, the service center VRU preferably informs the user that the results have been obtained. Step 307 ends when service center VRU preferably either terminates or suspends the telephone call depending on what type of service is being performed (although it should be appreciated that the call may continue in particular embodiments, such as where the aforementioned simultaneous data and voice connection are maintained). If the service only requires a single interaction with the user, the service center VRU may terminate the telephone call. Otherwise, if the service requires multiple interactions with the user, the service center VRU will preferably suspend the call until the currently obtained data has been retrieved by the user, after which the call connection will be reestablished to continue the service.

It should be noted that in particular embodiments of the present invention, either the service center VRU, the wireless application, the user, or any combination thereof may terminate or suspend the telephone call.

In step 308, the results stored in the data store are translated into an appropriate wireless-compatible format and forwarded to a data network server. On termination or suspension of the telephone call, the wireless application which initiated the telephone call preferably displays an option, in step 309, for the user to retrieve the requested information. Finally, in steps 310 and 311, the user may actuate the "RESULTS" option which signals the data network server to forward the requested information for display on the mobile device's visual display. If the service performed requires additional interaction with the service center VRU, the call will then be reestablished after the results have been displayed on the mobile device.

It should be noted that in an alternative embodiment, the service center VRU will automatically cause the retrieved information to be forwarded to the user's mobile device. In this alternative embodiment, step 307, which could be optional, could be modified to have Service Center VRU 22 inform the user that the requested information is being sent to the user's mobile device. In a possible modified step 308, the results could be translated and forwarded to a data network server. Original steps 310 and 311 could, therefore, be omitted, substituted by a possible final step 309 in which the user's mobile device displays the information automatically sent by the data network server.

It should also be noted that in an alternative embodiment, the data store may preferably preserve the data or information indefinitely. This alternative embodiment would allow the user to repeatedly access the retrieval information until the user or the network provider deletes the information. This alternative embodiment may also allow for the information service itself to automatically update the stored information, if appropriate, making updated information available for the user during subsequent accesses of the system without explicit user interaction being required.

Figure 4A:
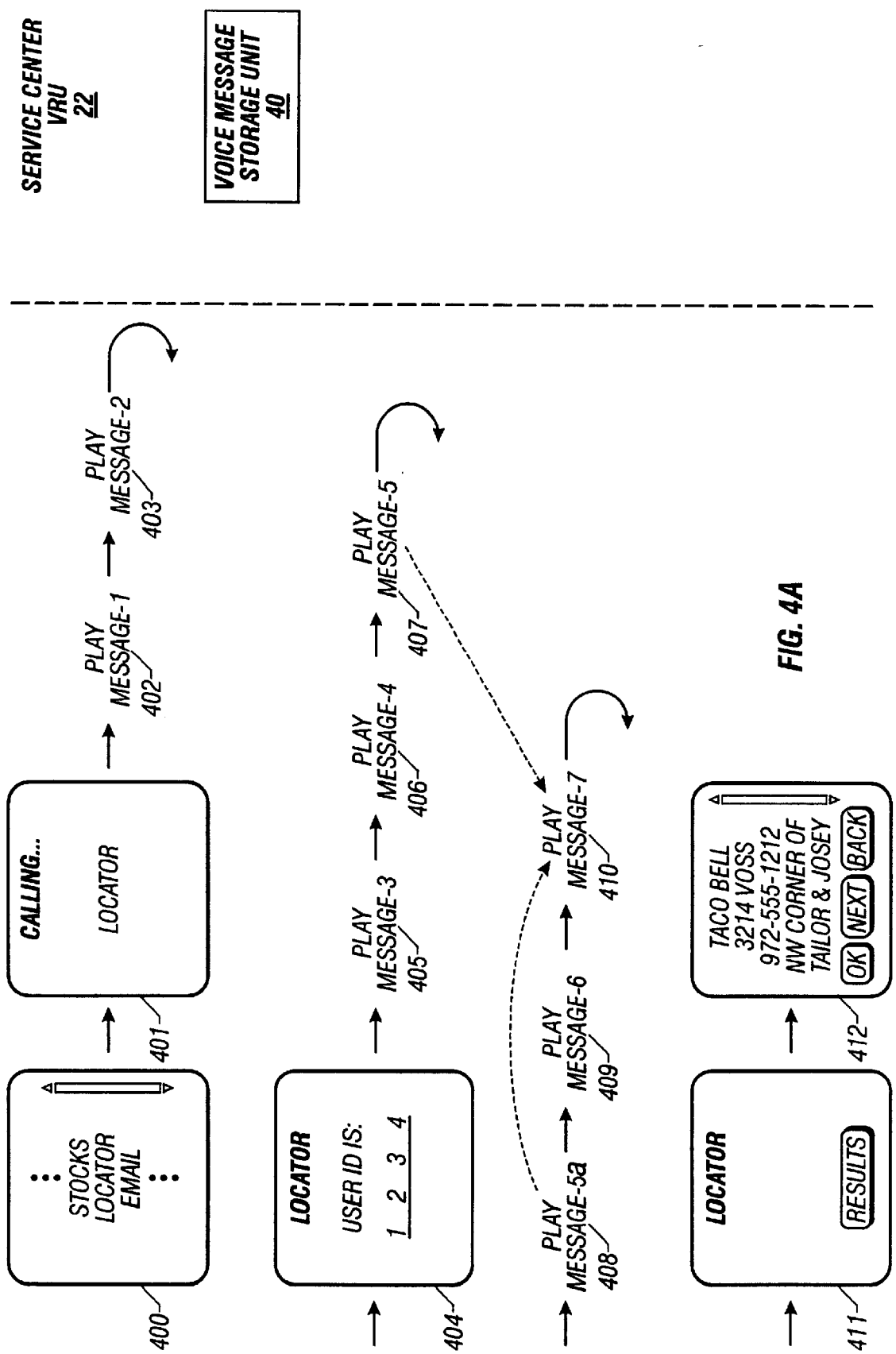
FIG. 4A is a flow diagram showing the steps executed by a preferred embodiment of the present invention executing a typical application which includes typical corresponding user interface displays.

Any number or variety of services or information can be offered through a preferred embodiment of the present invention. FIGS. 4A and 4B graphically demonstrate a preferred embodiment implementation of one particular service, a locator service, which may be implemented using a preferred embodiment of the present invention. A caller connects to his/her information service and receives wireless application data or information into his/her mobile device from a data network server. The wireless application displays menu choices on the mobile device for the caller to choose from.

In this example, the caller chooses the "Locator" menu choice, as shown on display 400, using the keys or buttons on the mobile device. The wireless application initiates a phone call to the service provider and presents display 401 on the caller's mobile device while the call is being completed. When the service center VRU answers the phone call, Service Center VRU 22 accesses voice message storage unit 40 and executes play message-1 402 which greets the caller. Service Center VRU 22 may use data sent by the wireless application, call signals, such as ANI, MIN, or DNIS, a remote or local host application server, or could even directly elicit information from a user (not shown) to determine which service voice application to execute. After determining which service to run, Service Center VRU 22 then executes play message-2 403 which asks the caller to speak his/her user ID number. An alternative implementation of the application may not require a user authentication step, thereby eliminating step 404. The speech recognition technology incorporated into Service Center VRU 22 recognizes the caller's response and converts it into useable electronic data. Service Center VRU 22 temporarily interrupts the call flow to direct the data network server to send updated wireless application data or information to the caller's mobile device which causes the user's ID number to be displayed on the mobile device, display 404. Service Center VRU 22 will then reestablish the call flow and executes play message-3 405, to confirm the caller's user ID. At this point, Service Center VRU 22 interacts with the caller to perform the service requested. In this particular example, Service Center VRU 22 executes play message-4 406, -5 407, -5a 408, -6 409, and -7 410 and further prompts the user for information regarding his current location (not shown) which obtain the required information to perform the particular service that the caller wishes to locate. From the context of the messages, the caller is trying to locate a fast food restaurant in his/her area. When the results of the location request have been obtained, Service Center VRU 22 preferably sends the information to the data network server and may terminate the call connection. Service Center VRU 22 may store the search results in a permanent or semipermanent memory location accessible by the individual user alone. This user-specific memory configuration would allow the user to revisit the search results as many times as necessary. The user or the network provider could optionally delete the search results. The wireless application that initiated the phone call then presents the caller with an option to retrieve the results of the search as shown on display 411. If the caller actuates the "RESULTS" button on display 411, the retrieved information is forwarded to the mobile device and presented to the caller in a fashion similar to display 412.

In an alternative operation of the "Locator" service, instead of terminating the connection between the caller and Service Center VRU 22, the call is merely suspended pending an additional request made by the user. In this type of operation, Service Center VRU 22 maintains the information and request made by the user for a certain period of time. If the user activates the Locator service again within that time frame, the call is reestablished and the user is prompted for additional information. Because the communication connection was suspended, Service Center VRU 22 would not have to start at the beginning of the voice application. Therefore, if the user asks for additional restaurant locations, Service Center VRU 22 will not repeat the information previously obtained. In this embodiment, Service Center VRU 22 can be programmed to terminate the suspended call connection if the user does not activate the Locator service within a specified period of time.

Another typical example of a service which can be implemented with a preferred embodiment of the present invention is a stock service that allows for viewing and trading stocks using a mobile device. FIGS. 5A and 5B graphically demonstrate this particular service. A caller connects to his/her information service and receives a wireless application and data into his/her mobile device from a data network server. The mobile device displays menu choices for the caller to choose from. Using the buttons on the mobile device to scroll through the menu, the caller chooses the "Stocks" menu choice as shown on display 500. The wireless application initiates a phone call to Service Center VRU 22 and presents display 501 on the caller's mobile device. As the service center answers the phone call, Service Center VRU 22 accesses voice message storage unit 40 and executes play message-11 502 which greets the caller. Service Center VRU 22 then executes play message-12 503 which asks the caller to speak his/her user ID number. The speech recognition technology incorporated into Service Center VRU 22 recognizes the caller's response and converts it into useable electronic data. Service Center VRU 22 temporarily interrupts the call flow to direct the data network server to send updated wireless data to the caller's mobile device which causes the user's ID number to be displayed on the mobile device, display 504. Service Center VRU 22 will then reestablish the call flow and execute play message-13 505, to confirm the caller's user ID. Because the stock service involves access to financial accounts, there may be a need to increase the security used in accessing the service. To increase the level of security, Service Center VRU 22 executes play message-14 506 which asks for a user password. Depending on whether the user spoke the correct password or the automatic speech recognition technology accurately translated the user's speech, Service Center VRU 22 will either execute play message-15a 507, if the password was incorrect, or play message-15b 508, if the password was correct. If the password was incorrect, Service Center VRU 22 will re-execute play message-14 506 to obtain the password from the user again. For additional security, Service Center VRU 22 can be programmed to disconnect the stock service connection if an incorrect password is spoken a set number of times, such as three times, or after a predetermined time interval. Service Center VRU 22 can further be programmed to prohibit any connection to the stock service for a specific amount of time if a caller has failed to successfully access the service a set number of consecutive times, or even until such time as the service is re-enabled for the specific user by a customer service representative.

If the password is correct, Service Center VRU 22 executes play message-15b, suspends the call connection, and directs the data network server to forward new wireless data to the caller's mobile device. The new wireless data allow the caller to view the service menu as shown on display 509. In this particular example, the user chooses the "Quotes" menu choice. The wireless application changes the mobile device display to the associated wireless information, which shows the list of stocks currently on the user's watch list, as in display 510. This watch list was preferably previously specified by the user during prior usage of the service, and stored either in an external host data server or in the data store 24, indexed by the user's unique id. Using the scrolling capabilities or entering the number corresponding to a displayed stock, the caller can obtain more information regarding that particular stock by scrolling to additional wireless information, as shown in display 511.

The caller also has the capability to add or delete stocks from his/her watch list in real time. The user may navigate back to the watch list portion of the wireless data, as in display 512, and select the "ADD" button using one of the keys or buttons on the mobile device. The wireless application would present a calling screen to the caller, as shown in display 513, and reestablishes the call connection with Service Center VRU 22. Service Center VRU 22 would then preferably execute play message-16 514 requesting the caller to speak either the name or the stock symbol of the stock he/she wishes to add. As Service Center VRU 22 receives the information from the caller, it sends the requested stock information to the data network server, executes play message-17 515, which informs the caller that the stock has been added, and then suspends the phone call again. The wireless application on the mobile device which initiated the call will reestablish the connection with the service and preferably presents the user with an option to retrieve the results, as shown in display 516. If the user chooses to actuate the "RESULTS" option, the data network server will preferably send the newly formatted wireless information to the mobile device which includes the added stock information. The new wireless information will present the results to the caller as in display 517. As suggested in display 509, the Stocks service may also allow the caller to buy and sell stocks, obtain corporate information, and even get trading tips or suggestions.

In the described stock service, the system according to an alternative of the present invention may provide for a semi-permanent memory storage location accessible only by the user. Unlike the Locator service, which retrieves and accesses non-sensitive information, the stock service accesses personal financial information that is typically more sensitive. The stock service would preferably provide a modified memory storage which only stores the transaction records and the last retrieved stock results. All other secure information or transaction information would preferably not be stored in the user-specific storage space.

The services which can be implemented using a preferred embodiment of the present invention are not limited only to the two preceding examples. The examples are presented only to show the interaction of the interface between the caller and the information service. As before, it should be noted that an alternative embodiment of the present invention could provide for HTTP Server 23, from FIG. 3, to automatically send the retrieved information to the mobile device as soon as the call connection is terminated. This, again, minimizes the amount of digital manipulation required by the mobile device user to obtain the desired information. It should also be noted that the services which can be implemented on a preferred embodiment of the present invention are not limited to the specific language or display formats shown in the preceding examples of operation. Display formats can take any shape or form compatible with any particular mobile device. Service providers may also choose the words they prefer to present menu options, voice prompts, or pre-recorded messages or instructions. Service providers may even choose to offer services in several different languages.

The preferred embodiment and service implementations described to this point have begun with the user establishing a connection with the data network and receiving wireless information relating to the service choices. It should be noted that in an alternative embodiment of the present invention, a user can activate a service by first calling the service center VRU. In this alternative embodiment, a user calls the service center VRU and activates a particular service. At any point during the connection when data may be given to the user, the service center VRU may suspend the call to allow the data network to send the information to the user's communication device. The user may then continue or make further choices with the service center VRU based on the information or wireless data read from the device display.

Although the present invention has been described as alternating connections between the data connection and the telephony connection, it is contemplated that an alternative embodiment of the present invention may incorporate parallel communication links between the data connection and the telephony connection. In this alternative embodiment, the mobile device preferably receives both data and telephony information and data simultaneously. In this manner, neither of the connections must be suspended while the other connection processes or delivers data or voice information.

One method to implement the alternative parallel connection would be to utilize the aforementioned link multiplexing technique and to preferably synchronize the VRU with the data server, such as by passing event information and/or other status information there between. In one embodiment, the enhanced wireless server of the present invention provides synchronizing link between the data server and the VRU. Additionally or alternatively, registers may be established in the data store in order to allow each portion of the blended application to remain apprised of the other's status By this synchronization, the VRU and data server would be able to coordinate their operation while maintaining a simultaneous and parallel connection to the mobile unit.

Consequently, an issue arises over the functionality of the device keypad. In typical operation, the device keypad operates with DTMF signals during telephony mode and other data signals in data mode. Several optional methods could be employed to implement this keypad issue according to the present invention. The device manufacturers would preferably add a "shift"-type key, which, when activated by the user, toggles the keypad functionality between DTMF and data signals. Alternatively, the mobile unit would preferably receive a control signal from either or both of the VRU and the data server which internally causes the mobile unit to switch functionality according to the operation of the device or the particular application being run. Still a third option, would preferably include defining (whether permanently or dynamically) certain data signal keys to control all data signal operations and certain DTMF signal keys to respond to non-data operations, while the device operated in the parallel connection mode. Additionally or alternatively, synchronization of the blended application may allow the other server to know when it has use of any or all available input devices, such as the keypad, and, therefore, when particular keys may be used thereby. Such alternatives are only representative of the method to control the functionality of the mobile device keypad.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A blended interface between a communication device and an information service comprising:
   a data network server having at least one service application accessible by said communication device;

wherein said communication device establishes a data link with said data network server responsive to a request to access said information service; and wherein said at least one service application downloads application instructions operable by said communication device to a memory on said communication device for accessing said information service;

a multimedia server (MMS) having at least one interactive voice application accessible by said communication device;

wherein at least one of said application instructions initiates a multimedia connection between said communication device and said MMS to execute said interactive voice application responsive to data provided to said MMS; and wherein said interactive voice application retrieves information responsive to executing said information service;

wherein said MMS and said data network server exchange said retrieved information responsive to executing said information service, said voice application, and said service application; and wherein said data network communicates said exchanged information responsive to said information service to said communication device.

2. The interface of claim 1 wherein said MMS has speech recognition capability.

3. The interface of claim 2 further comprising:

a data storage unit for storing said information retrieved or processed by said interactive voice application; and a protocol converter for translating said information into a protocol compatible with said communication device, wherein said protocol converter forwards said translated information to said data network server.

4. The interface of claim 3 wherein said data storage unit provides repeated access by a user to said information retrieved until one of said user and an information service provider deletes said information retrieved.

5. The system of claim 1 wherein said data provided to said MMS is chosen from the group consisting of:

information provided directly by a user of said communication device;

signals provided by said communication device;

information and signals provided by said application instruction information provided by a host application server; and call data signals.

6. The system of claim 5 wherein said host application server is disposed remote to said system.

7. The system of claim 5 wherein said call data signals are chosen from the group consisting of:

automatic number identification (ANI) signals;

mobile identification number (MIN) signals; and dialed number identification service (DNIS) signals.

8. The system of claim 2 wherein said application instructions automatically initiates said communication connection.

9. The system of claim 1:

wherein operation of said application instructions is suspended during said interactive voice application and is reactivated on suspension of said interactive voice application; and wherein said interactive voice application is suspended to allow said communication device to operate certain of said application instructions and receive said retrieved or processed information from said service application.

10. The system of claim 1 wherein said MMS comprises a voice response unit (VRU).

11. A method for providing a blended interface between a communication device and an information service comprising the steps of:

establishing a data connection between said communication device and a data network;

providing said communication device at least one data application from said data network allowing access to said information service;

displaying visual information from said data application on a display connected to said communication device;

establishing a voice communication connection between said communication device and a voice server responsive to execution of said at least one data application;

selectively providing at least one voice application to said communication device associated with said data application and responsive to information provided to said voice server;

retrieving information by said at least one voice application using said information provided to said voice server;

establishing communication between said voice server and said data network;

communicating said retrieved information from said voice server to said data network; and forwarding said communicated retrieved information from said data network to said communication device.

12. The method of claim 11 further comprising the step of:

converting speech received by said voice server into useable electronic data for executing said voice application.

13. The method of claim 11 further comprising the steps of:

storing information obtained and processed by said voice application;

converting said information obtained by said voice application into a format compatible with said communication device; and forwarding said converted data to said data network.

14. The method of claim 13 further comprising the steps of:

providing a user multiple accesses to said stored information; and deleting said store information responsive to a command issued by said user or an information service provider.

15. The method of claim 13 further comprising the steps of:

suspending said data application during said voice communication connection;

suspending said voice application; and reactivating said suspended data application when said voice application is suspended.

16. The user interface of claim 15 further comprising the steps of:

displaying an option on said communication device executable by a user for activating said forwarding step.

17. The method of claim 15 wherein said forwarding step is automatic.

18. The method of claim 15 further comprising the step of:

reactivating said voice application when said reactivated data application reestablishes said voice communication connection between said communication device and said voice server.

19. The method of claim 15 wherein said voice server comprises a voice response unit (VRU).

20. A system for interfacing a communication device with an information service provider comprising:

a server for providing at least one information application through a data connection to said communication device allowing access to said information service, wherein said communication device initiates a voice connection between said communication device and a multi-function server dependent on said provided information application;

said multi-function server for providing at least one voice application to said communication device;

wherein said voice application obtains information from a user of said communication device to execute said information service;

wherein said multi-function server selectively runs said voice application, dependent on said obtained information, for retrieving and processing information responsive to said execution of said information service; and wherein said multi-function server exchanges said retrieved and processed information with said server; and wherein said server forwards said exchanged information to said communication device.

21. The system of claim 20 wherein said multi-function server includes automatic speech recognition capability for translating speech signals into useable electronic data.

22. The system of claim 21 further including
a memory for storing said information obtained and processed by said voice application; and
a conversion unit for converting said information into a format compatible with said communication device, wherein said conversion unit forwards said converted information to said server.

23. The system of claim 22 wherein said memory comprises a non-volatile memory for storing said information until deleted by one of said user or said information service provider.

24. The system of claim 22 wherein said voice application suspends said voice connection between said communication device and said multi-function server.

25. The system of claim 22 wherein said communication device suspends said voice connection between said communication device and said multi-function server.

26. The system of claim 22 wherein said information application suspends said voice connection between said communication device and said multi-function server.

27. The system of claim 24
wherein said information application is suspended while said communication device is connected to said multi-function server; and
wherein said information application reactivates during said suspended voice connection between said communication device and said multi-function server.

28. The system of claim 22 wherein said server forwards said exchanged information automatically.

29. The system of claim 27 wherein said reactivated information application displays an option executable by said user to retrieve said converted information to said communication device.

30. The system of claim 20 wherein said information provided to said multi-function server is chosen from the group consisting of:
information provided directly by a user of said communication device;
signals provided by said communication device;
information and signals provided by said information application;
information and signal provided by an external information server; and
call data signals.

31. The system of claim 30 wherein said call data signals are chosen from the group consisting of:
automatic number identification (ANI) signals;
mobile identification number (MIN) signals; and
dialed number identification service (DNIS) signals.

32. The system of claim 21 wherein said information application automatically initiates said voice connection between said communication device and said multi-function server.

33. The system of claim 21 wherein said multi-function server comprises a voice response unit (VRU).

34. A user interface between a communication device and an information service provider comprising:
means for establishing a data connection between said communication device and a data network;
means for downloading at least one data application to said communication device allowing access to said information service;
means for displaying visual information from said data application on a display connected to said communication device;
means dependent on said data application for indicating a communication connection between said communication device and a voice response unit (VRU);
means for selectively providing at least one voice application to said communication device associated with said data application and responsive to information provided to said VRU;
means for retrieving information responsive to execution of said at least one voice application;
means for exchanging said retrieved information between said VRU and said data network; and
means for forwarding said exchanged retrieved information from said data network to said communication device.

35. The user interface of claim 34 further comprising:
means included in said VRU for converting speech signals into useable electronic data.

36. The user interface of claim 34 further comprising:
means for storing information obtained and processed by said voice application responsive to a request made by a user of said communication device; and
means for converting said information obtained and processed by said voice application into a format compatible with said communication device, wherein said converted information is forwarded to said data network.

37. The user interface of claim 36 further comprising:
means for providing said user repeated access to said stored information.

38. The user interface of claim 36 further comprising:
means for suspending said data application during said voice connection
means for suspending said voice application; and
means for reactivating said suspended data application when said voice application is suspended.

39. The user interface of claim 38 further comprising:
means for reactivating said voice application when said reactivated data application reestablishes said voice connection between said communication device and said VRU.

40. The user interface of claim 38 wherein said means for forwarding are automatic.

41. The user interface of claim 38 wherein said means for forwarding are selectable by said user.

* * * * *

UNITED STATES PATENT AND TRADEMARK OFFICE
CERTIFICATE OF CORRECTION

PATENT NO.      : 6,501,956 B1
DATED           : December 31, 2002
INVENTOR(S)     : Eric Weeren et al.

It is certified that error appears in the above-identified patent and that said Letters Patent is hereby corrected as shown below:

Column 20,
Line 17, insert -- said data application -- after "device" and before "allowing"
Line 22, delete "indicating" and insert -- initiating --

Signed and Sealed this

Fifteenth Day of July, 2003

JAMES E. ROGAN
*Director of the United States Patent and Trademark Office*